(12) United States Patent
Marais et al.

(10) Patent No.: US 8,579,378 B2
(45) Date of Patent: Nov. 12, 2013

(54) SEAT BELT ATTACHMENT FOR AIRCRAFT SEAT

(75) Inventors: Jean Charles Marais, Sainte Lizaigne (FR); Joel Marais, Charost (FR)

(73) Assignee: Zodiac Seats France (FR)

( * ) Notice: Subject to any disclaimer, the term of this patent is extended or adjusted under 35 U.S.C. 154(b) by 25 days.

(21) Appl. No.: 13/308,729

(22) Filed: Dec. 1, 2011

(65) Prior Publication Data

US 2012/0138745 A1 Jun. 7, 2012

Related U.S. Application Data

(60) Provisional application No. 61/418,483, filed on Dec. 1, 2010.

(51) Int. Cl.
*B60R 21/02* (2006.01)
(52) U.S. Cl.
USPC ........................................ 297/468; 297/216.1
(58) Field of Classification Search
USPC .............................................. 297/216.1, 468
See application file for complete search history.

(56) References Cited

U.S. PATENT DOCUMENTS

| 4,229,041 | A | * | 10/1980 | Werner | 297/468 |
| 5,301,569 | A | * | 4/1994 | Droulon | 74/531 |
| 6,382,718 | B1 | * | 5/2002 | Janke et al. | 297/216.16 |
| 7,036,878 | B2 | * | 5/2006 | Masutani | 297/216.1 |

FOREIGN PATENT DOCUMENTS

| DE | 3705571 | 9/1988 |
| FR | 2851974 | 9/2004 |
| GB | 2265813 | 10/1993 |

OTHER PUBLICATIONS

International Search Report and Written Opinion dated May 11, 2012 in Application No. PCT/IB2011/002910.
International Preliminary Report on Patentability dated Jun. 13, 2013 in Application No. PCT/IB2011/002910.

* cited by examiner

*Primary Examiner* — Sarah B McPartlin
(74) *Attorney, Agent, or Firm* — Dean W. Russell; Kristin M. Crall; Kilpatrick Townsend & Stockton LLP (57) ABSTRACT

Embodiments of the invention provide systems and methods for locking a seat belt with respect to a fixed base frame to prevent movement of a movable seat portion in the event of a crash or crash-like condition on an aircraft.

6 Claims, 7 Drawing Sheets

SEAT BELT ATTACHMENT FOR AIRCRAFT SEAT

This application claims the benefit of U.S. Provisional Application Ser. No. 61/418,483, filed Dec. 1, 2010, titled "Seat Belt Attachment for Premium Passenger Seat for Civil Aircraft," the entire contents of which are hereby incorporated by reference.

FIELD OF THE INVENTION

Embodiments of the present invention relate generally to seat belts designed for use with passenger seats that convert from an upright position to a bed-like or relaxed position. Such seat belts are attached to a movable part of the seat and are configured to retain the passenger in any position and in normal seat belt usage conditions (such as take off and landing and air turbulence) as well as extreme seat belt usage conditions (such as crash or crash-like conditions).

BACKGROUND

Aircraft and other passenger transport vehicle seats are often designed to allow passengers to move from a fully seated upright position to a partially or fully reclined position. These seats may allow only a slight backward motion, or they may be seats that are convertible to a bed, i.e., to a substantially flat bed position so that the passenger may lie down. Premium seats for civil aircrafts typically offer a number of various seat positions, from the most upright position to a full flat or a lie flat bed position. In some instances, these seats may also be surrounded by a privacy shell or partition, which allows seat motion and other passenger movement without interrupting the space of the passenger behind. In that case, the seats are usually composed of a fixed base frame, a movable part used as a seat pan, a back rest, and one or more electrical actuators for seat position adjustment. From upright to the bed-like position, the movable part of the seat will move forward or backward, allowing or causing the backrest to recline or raise without interfering with the privacy shell.

The passenger seat belt is typically attached to the movable part of the seat, in order to retain the passenger in any position. It is important for the seat belt to function to both hold the passenger in place during normal activities, such as take-off and landing and normal air turbulence, as well as to safely restrain the passenger in place during extreme turbulence or crash/crash-like conditions.

Airline guidelines generally require that passenger seats must sustain crash conditions when in upright position. The main issue to solve is thus how to transfer the load due to the passenger mass up to the seat attachment point, knowing that the seat deflection should be limited. This has been done previously either using electromagnetic locker pins to secure the movable part of the seat to the base frame in its upright position or using the brake of the actuator to sustain the load. Both solutions add weight and cost to the design. Accordingly, improved seat belts and securing functions are needed.

BRIEF SUMMARY

Embodiments of the invention described herein thus provide systems and methods for locking a seat belt with respect to a fixed base frame for an aircraft seat to prevent movement of a movable seat portion in the event of a crash or crash-like condition on an aircraft.

A specific embodiment provides a seat belt system for use on an aircraft seat, comprising: a positionable seat, comprising a fixed base frame and a movable seat part; a seat belt associated with the movable seat part; and a system for locking the seat belt with respect to the fixed base frame. One embodiment may use an angled track. Another embodiment may use a flyweight system.

DETAILED DESCRIPTION

A primary safety consideration for aircraft seat belts is that the seat belt must hold a passenger in place during a crash or crash-like conditions, as well as in turbulence, taxi, take-off and landing situations. The latter situations are less extreme and typical seat belt attachments are generally suitable. However in more extreme turbulence or crash conditions, the aircraft will typically experience drastic movements (bouncing, jolting, rapid acceleration, rapid deceleration, and other jarring motion). In these conditions, it is particularly important that passengers wearing seat belts are held in place, and that the seats to which the seat belts are secured are also held in place.

Seat belt securement concerns are less pronounced for seats in the economy cabin, because those seats have the seat belt attached to a rigid, fixed part of the seat. Attachment of the seat belt to a fixed part of the seat means that the forward force of a passenger load in a crash condition is unlikely to cause the fixed portion of the seat to deform or to detach from the aircraft. However, premium seats that have a movable seat pan that moves significantly to allow the seats to recline (to relax or to a bed-like position) typically have their seat belt portion secured to the movable seat pan. This allows the seat belt to follow the hips of the passenger so that s/he can keep the seat belt on during the reclining motion, as well as once the bed-like position has been reached. However, in the event of extreme turbulence or a crash, securing the passenger is of primary importance, which can present a challenge with a seat belt that is secured to the movable seat pan. Thus, one potential solution is to secure the seat belt with respect to a fixed part of the seat. Certain embodiments described herein thus provide systems and methods that secure a seat belt to a fixed portion of the seat in extreme turbulence and crash/crash-like conditions when the seat is in the upright position.

Embodiments of the present invention provide a seat belt attachment system designed to transfer the load due to the passenger directly to the fixed base frame when the seat in the upright position and under crash conditions. One way to do this is to link the seat belt to a fixed part of the seat upon the occurrence of extreme movement or turbulence.

In one embodiment, the seat system 10 includes a fixed base frame 12, a movable part 14, such as a moveable seat pan, and a back rest 16. Exemplary aircraft seats are described in co-pending application Ser. No. 13/308779, titled "Aircraft Seat," and filed on Dec. 1, 2011. The seat belt system 18 may include a seat belt portion 20 and a linkage 22. The seat belt 20 is secured to the linkage 22 through an axis 24 or a pivot point or bolt 23. The linkage 22 is then attached to the seat movable part 14 through a rotation axis. The linkage shown in FIGS. 1-4 is illustrated as a generally triangular shaped element, but it should be understood that any appropriate shape may be used, as long as linkage 22 can secure the seat belt or a portion of the seat belt to a fixed portion of the seat. The linkage 22 may have an element 26, such as a roller or pin or other element or protrusion that can move along a track.

The track 28 is a groove or indented portion on the fixed base frame 12. It may extend completely through the frame to create a open track or it may only be an indented portion that does not create a complete opening through the frame. Track 28 is a generally linear portion on the frame 12, but it has an angled portion 30 at one end thereof The angled portion 30 may be an upward slope or curve, it may be a J-shape, a T-shape, or any other appropriate portion that can capture element 26.

Figure 1:
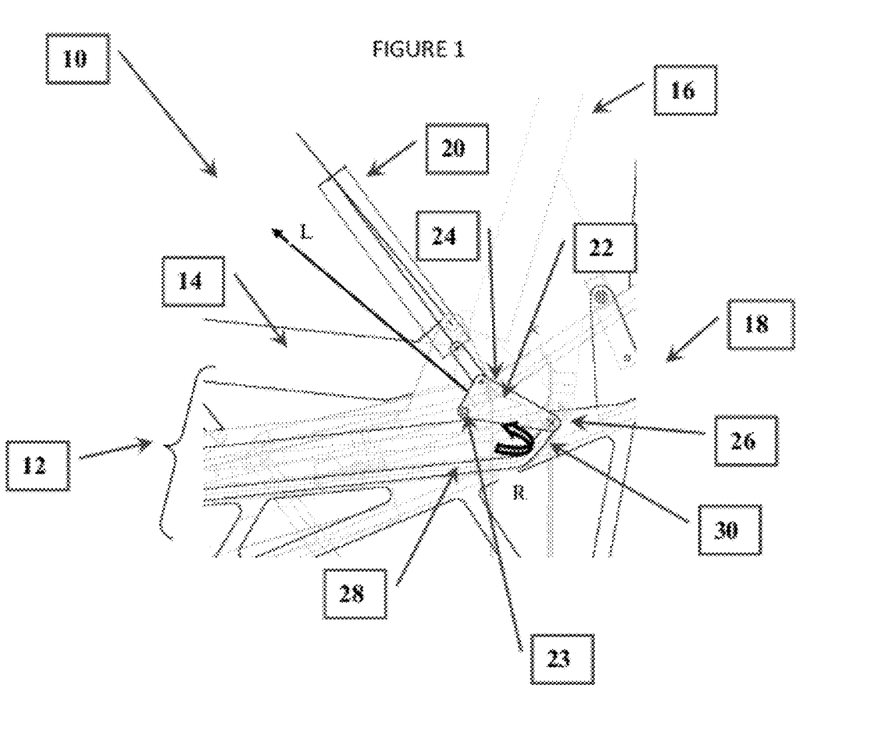
FIG. 1 shows a side cross sectional view of one embodiment for a seat belt locking system in a locked position.
Figure 2:
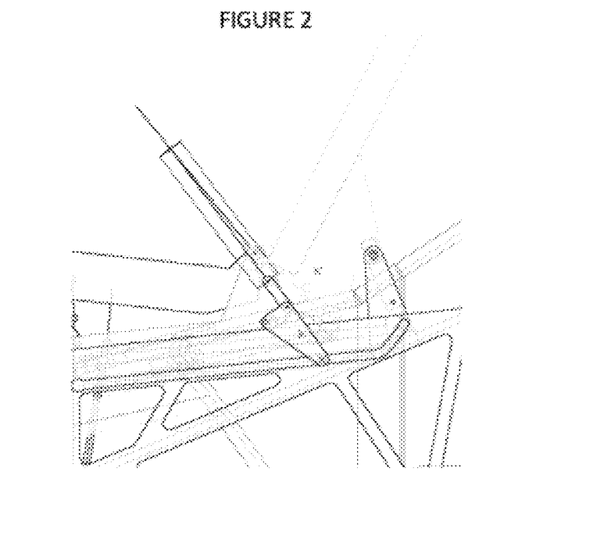
FIGS. 2 and 3 show a side cross sectional views of the seat belt locking system of FIG. 1 in unlocked positions.
Figure 3:
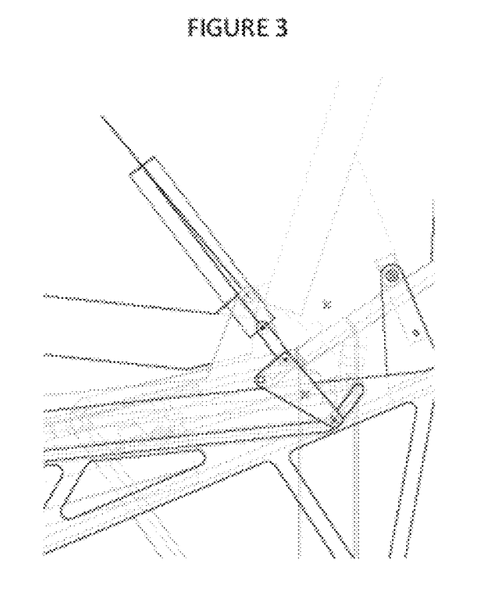
Figure 4:
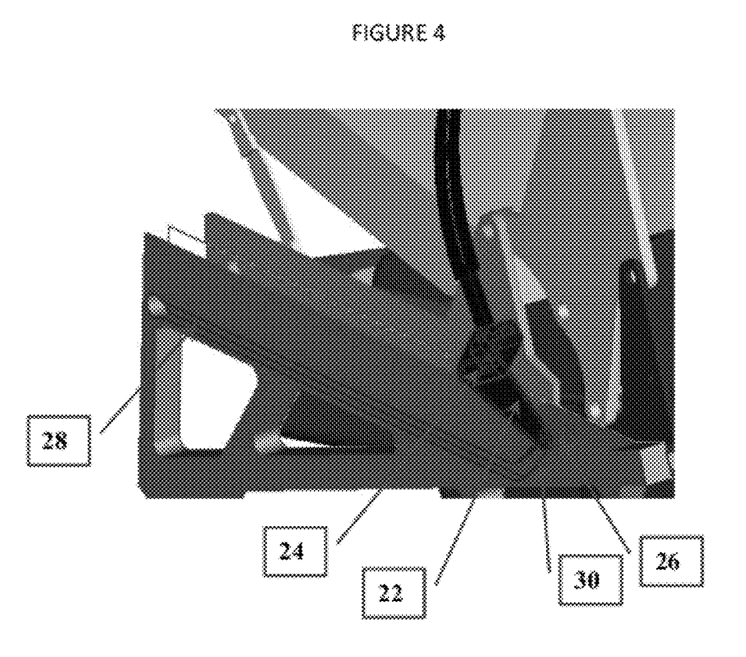
FIG. 4 shows a perspective view of the seat belt locking system of FIG. 1.

Cooperation between the element 26 and the track 28 may be accomplished by a roller/track configuration, a pin/groove configuration, or any other appropriate cooperation that maintains element 26 in track 28. When the seat is in an upright position, the element or roller is positioned in the most aft part of the track, and may even be positioned into the angled portion of the track, as shown in FIG. 1. Any forwardly-oriented load applied to the seat belt, will create an upward rotation of the roller, locking the roller in the angled portion (or the "T") of the track end, transferring the load experienced by the seat belt directly to the base frame 12. The load may cause the linkage to rotate (shown by arrow "R" in FIG. 1) about the pivot pin 24 and become locked in the upper part of the track due to the load direction (shown by arrow "L") in the event of a crash. In that case, the movable part 14 cannot move forward, being locked by the roller and the track. In any other seat position, the element or roller is allowed to move freely along the track, as shown in FIGS. 2 and 3. This allows the passenger to comfortably adjust the seat at appropriate times in the flight, but ensures that in the event of a potential crash situations (taxi, take-off and landing), the seat belt is ready to be secured and locked to a fixed point (i.e., the fixed frame 12) if a force load is experienced. The angled portion (or the "T") of the track acts to keep the roller in place, even in case of seat deformation. Securing the linkage 22, and thus, the seat belt, to a fixed portion of the frame 12 helps reduce the possibility of the movable part 14 detaching from the frame, further ensuring passenger safety.

A further embodiment is an alternate seat belt system 32 is shown in FIGS. 5-8. Thus system 32 also provides a locking system that attaches a seat belt to a fixed part of the frame 12. In general, the system uses a weighted lever that, in the event of a large acceleration or deceleration or other turbulent crash event, will move and unlock a mechanical system. The system is locked under normal conditions, which means that the seat belt is not engaged or fixed to the frame, except for in crash conditions that unlock the below-described system.

The system 32 provides a locking bar 34 that is mechanically linked or otherwise secured to the movable seat pan (to which the seat belt 20 is secured). Locking bar is provided with a series of indented teeth 35 or features that create one or more indentations in the bar 34. As will be discussed below, these teeth indentations act to capture elements that are positioned and locked on the fixed base frame. This will secure the bar 34 to the frame 12, effectively securing the seat belt to the fixed frame, and will prevent further movement of the seat belt 20. The locking system further includes a body 36 that is locked in a preloaded position by a flyweight lever 38. The flyweight lever 38 is directly linked to the main fixed part of the seat, a set of springs 40, and a set of elements 42, which may be locking pins or rollers or other protrusions that may be received by a track or grooved portion 44. The fixed part of the seat has grooves 44 or openings in which elements 42 may be received when the system is unlocked.

The flyweight lever 38 is allowed to rotate around an axis 46 that is attached to or otherwise associated with the fixed part or frame 12. One side of the lever 38 may have a flyweight 48 and the other side may have a roller feature 50. The body 36 may be allowed to move slightly inside a groove of the fixed part, and is pushed forward by the set of springs 40. The body is provided in order to guide the set of elements 42 (e.g., locking pins or rollers).

Figure 5:
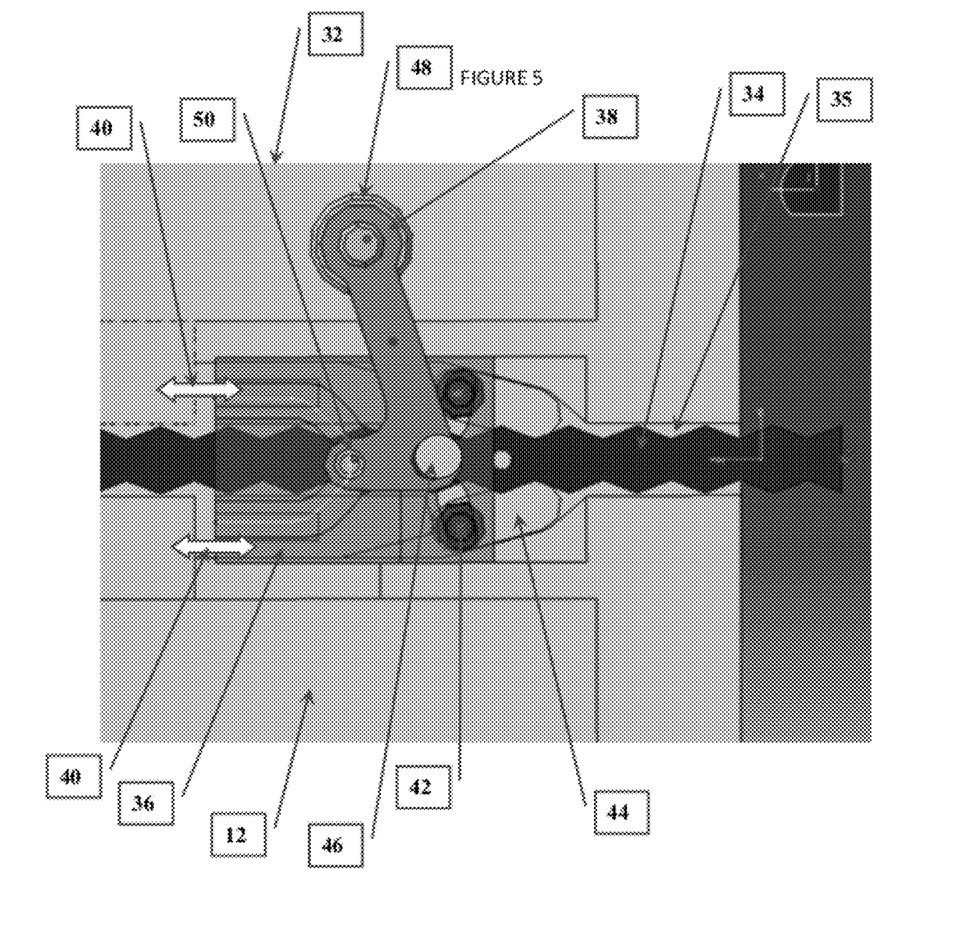
FIG. 5 shows a side cross sectional view of an alternate embodiment for a seat belt locking system in a position wherein the seat belt is not locked.
Figure 6:
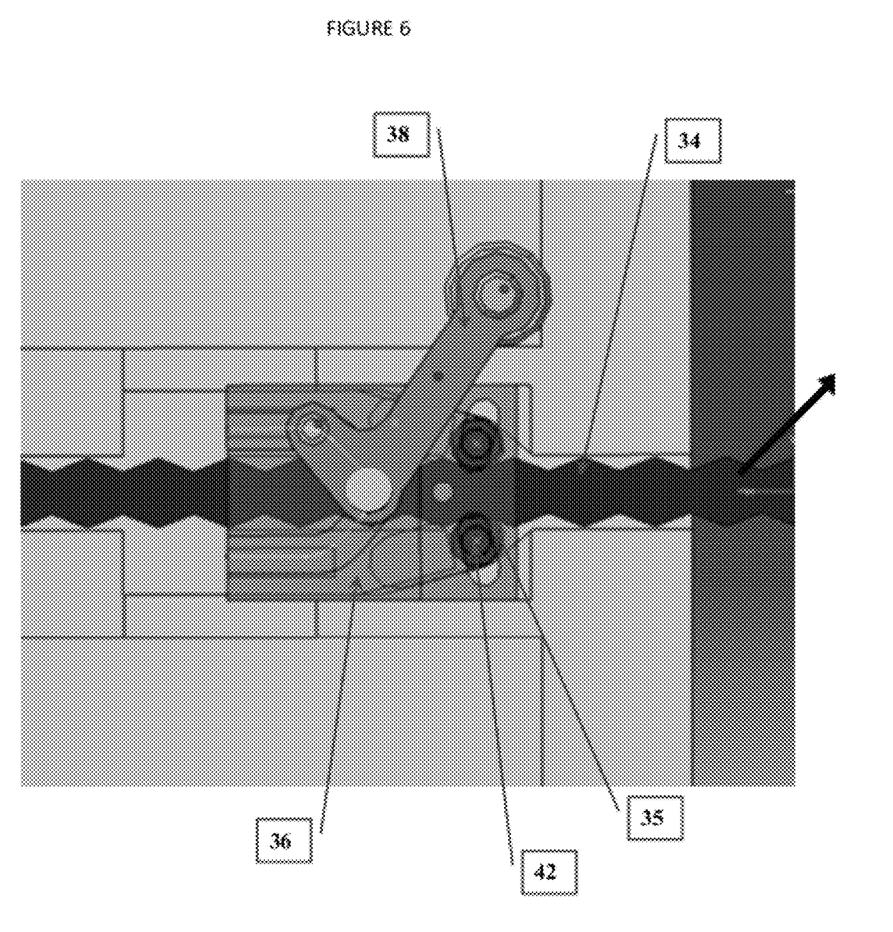
FIG. 6 shows a side cross sectional view of the seat belt locking system of FIG. 6 in a position wherein the seat belt is locked.
Figure 7:
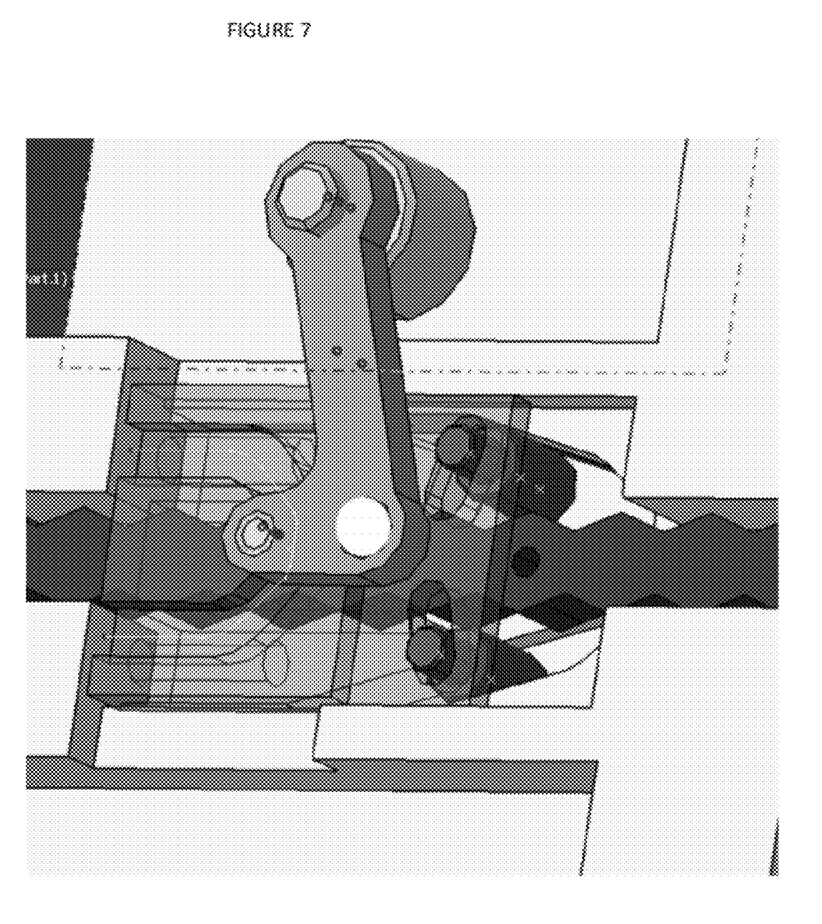
FIGS. 7 and 8 show perspective views of the locking system of FIGS. 5 and 6.
Figure 8:
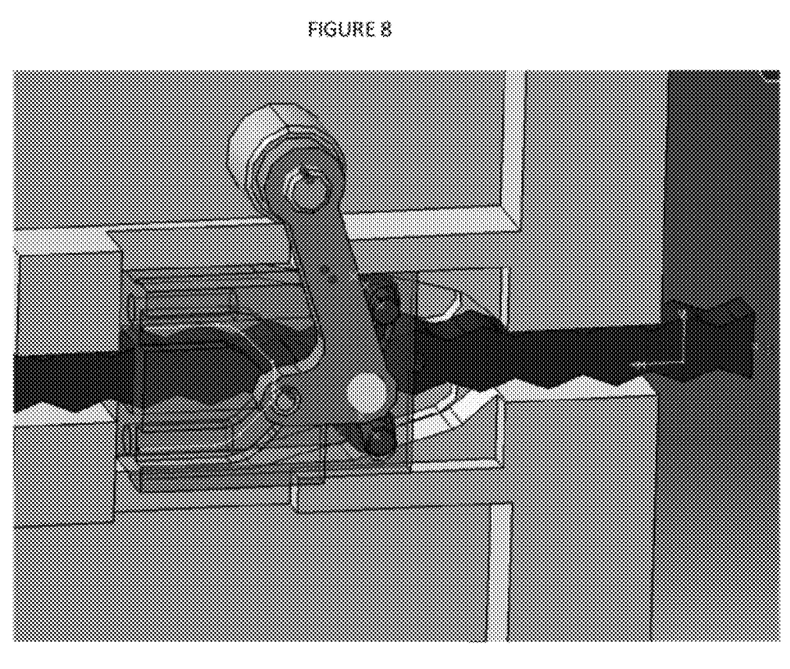

In normal conditions, the flyweight lever 38 keeps the body 36 in its preloaded position. In that position, the elements 42 (locking pins or rollers), are located outside the envelope of the locking bar 34, so the locking bar 34 can move freely. However, during a crash, the flyweight lever 38 rotates on its axis 46 due to the decceleration acting on the flyweight 48. The motion of lever causes the body 36 to move forward due to the spring load from springs 40 that pushes against the body 36 when the flyweight 38 is moved. (This movement is shown by a comparison between FIGS. 5 and 6, with FIG. 5 showing the normal load (locked) condition and FIG. 6 showing a crash (unlocked) condition.) The movement of the body 36 pushes the elements 42 (locking pins or rollers) against the locking bar 34. In the embodiment shown, the elements are pushed against the teeth 35 or indented portions of bar 34. Because the bar 34 is now locked compared to the fixed part of the seat, the seat belt attachment is also locked. This provides a fixed connection between the moving part 14 (to which the seat belt is attached) and the fixed frame 12.

In summary, in a crash condition, the flyweight 38/48 acts as a lever, moving forward or backward. Its movement allows elements 42 to escape their locked position and move freely, released by the body 36. However, body 36 is pushed forward by a spring force, and openings in the body capture the elements and force/trap them against the locking bar.

Because the seat belt itself is attached to the movable seat pan, which is a moving part, the present inventors have provided systems and methods that seek to secure the seat belt to a fixed point of the frame. In doing so, they have also sought to reduce the length of the load path. For example, if the seat pan has a long load path, then there are more parts that need to be reinforced. If the load pass can be reduced, which is done in some embodiments, there is a smaller segment that needs to be reinforced, which can result in fewer parts used and a lighter overall system.

Changes and modifications, additions and deletions may be made to the structures and methods recited above and shown in the drawings without departing from the scope or spirit of the invention and the following claims.

What is claimed is:
1. A seat belt system for use on an aircraft seat, comprising:
  (a) A positionable seat, comprising a fixed base frame and a movable seat part;
  (b) A seat belt associated with the movable seat part; and
  (c) A system for locking the seat belt with respect to the fixed base frame under crash conditions, wherein the system for locking the seat belt comprises (i) a track on the fixed base frame that has a generally linear portion and an upwardly angled portion at one end thereof; and
  (ii) a linkage secured to the seat belt, attached to the seat movable part through a rotation axis, and having an element configured to be received by the track, wherein a forwardly-oriented load when the positionable seat is in an upright position causes the element to move into the upwardly angled portion of the track.

2. The seat belt system of claim 1, wherein movement of the element into the upwardly angled portion of the track transfers the load experienced by the seat belt directly to the base frame.

3. The seat belt system of claim 1, wherein the element configured to be received by the track comprises a roller.

4. A seat belt system for use on an aircraft seat, comprising:
(a) A positionable seat, comprising a fixed base frame and a movable seat part;
(b) A seat belt associated with the movable seat part; and
(c) A system for locking the movable seat part with respect to the fixed base frame under crash conditions, wherein the system for locking the movable seat part comprises (i) a locking bar having a series of indented teeth and being linked to the movable seat part, (ii) a flyweight lever associated with the fixed base frame and rotatable about an axis on the fixed base frame, (iii) a body locked in a preloaded position by the flyweight lever, (iv) a spring system configured to push the body forward when the flyweight is moved; and (v) one or more elements on the fixed base frame, the one or more elements receivable between the series of indented teeth on the locking bar, wherein a crash condition when the positionable seat is in an upright position causes the flyweight to rotate on the axis, which causes forward motion of the body due to action of the spring system, which pushes the one or more elements against the series of indented teeth of the locking bar, which locks the locking bar with respect to the fixed base frame and creates a fixed connection between the movable seat part and the fixed base frame.

5. The seat belt system of claim 4, wherein the flyweight lever comprises a movable body that acts as a lever, moving forward or backward on the axis, either (a) allowing the one or more elements to escape the series of indented teeth and move freely when released by the body or (b) causing the body to be pushed forward by a spring force such that openings in the body capture the elements and force them against the series of teeth of the locking bar.

6. The seat belt system of claim 4, wherein the elements comprise locking pins or rollers.

\* \* \* \* \*